United States Patent [19]

Mammone

[11] Patent Number: 4,581,437
[45] Date of Patent: Apr. 8, 1986

[54] METHOD OF TREATING FILAMENTS OF POLY(P-PHENYLENE-TRANS-BENZOBIS-THIAZOLE) OR POLY(P-PHENYLENE-CIS-BENZOBISOX-AZOLE)

[75] Inventor: Joseph F. Mammone, Cinnaminson, N.J.

[73] Assignee: E. I. Du Pont de Nemours and Company, Wilmington, Del.

[21] Appl. No.: 693,053

[22] Filed: Jan. 22, 1985

[51] Int. Cl.[4] .................. C08G 69/32; B29C 71/02
[52] U.S. Cl. .................................... 528/183; 264/83; 264/290.5; 264/345; 528/179; 528/336; 528/337; 528/377
[58] Field of Search .................. 264/29.6, 83, 29.2, 264/345, 346, 290.5; 528/337, 179, 183, 336, 377

[56] References Cited

U.S. PATENT DOCUMENTS 3,716,607  2/1973  Otani .................................. 264/83
4,051,108  9/1977  Helminiak et al. ................ 528/185
4,225,700  9/1980  Wolfe et al. ...................... 528/197
4,460,708  7/1984  Stuetz .............................. 264/29.2

FOREIGN PATENT DOCUMENTS 0754322  1/1971  Belgium ........................... 264/29.2
0136838  8/1983  Japan ............................... 264/29.2
0510539  6/1976  U.S.S.R. .......................... 264/29.2

OTHER PUBLICATIONS

Macromolecules 1981 V 14, pp. 921–924, 912–913, 1135–1138.
Carbon 1977 V. 15, pp. 129–138.
AFWAL-TR-83-4065, Jul. 1983, pp. 129–178.

Primary Examiner—Donald Czaja
Assistant Examiner—Hubert C. Lorin

[57] ABSTRACT

Poly(p-phenylene-trans-benzobisthiazole) and poly(p-phenylene-cis-benzobisoxazole) fibers are rendered more adherent to epoxy resins by treatment with an oxygen containing gas under specified conditions.

3 Claims, No Drawings

METHOD OF TREATING FILAMENTS OF POLY(P-PHENYLENE-TRANS-BENZOBIS-THIAZOLE) OR POLY(P-PHENYLENE-CIS-BENZOBISOXAZOLE)

The Government has rights in this invention pursuant to Contract No. F-33615-81-C-5148 awarded by the Department of the Air Force, Department of Defense.

BACKGROUND OF THE INVENTION

One of the deficiencies of epoxy composites reinforced with poly(p-phenylene-trans-benzobisthiazole) (PBT) fiber is the relatively low interlaminar shear strength (ISS) values obtained. This is believed to be due to poor adhesion between fiber and matrix resin. The improvement of ISS which may be of importance in certain end-use applications is a worthwhile objective.

SUMMARY OF THE INVENTION

This invention provides composites of improved interlaminar shear strength through use of reinforcing fiber selected from poly(p-phenylene-trans-benzobisthiazole) and poly(p-phenylene-cis-benzobisoxazole) fiber which have been treated with a gas mixture of from about 1 to 10% of oxygen and from about 90 to 99% of inert gas at a temperature of from 500° C. to 700° C. for from 1 to 100 seconds. The treated fibers are also part of this invention.

DETAILED DESCRIPTION OF THE INVENTION

Applicant has found that heating PBT filaments in a gas mixture of inert gas containing from about 1 to 10% of oxygen and from about 90 to 99% of an inert gas at a temperature of from 500° C. to 700° C. for from 1 to 100 seconds preferably while the filaments are under a tension of up to 2 grams per denier yields a fiber which gives improved ISS when employed as reinforcement in polymer matrices. The ability of the fiber to adhere to the matrix polymer as shown by ISS is enhanced substantially by the process of this invention. It is desirable when treating the PBT fibers to keep well below the prescribed upper range limits for oxygen content, time and temperature, consistent with obtaining improved adhesion, in order to retain desirable fibers properties. Preferably from 5 to 8% oxygen content should be employed at a temperature of 600° C. to 700° C. for from 20 to 90 seconds.

As measured by Electron Spectroscopy Surface Analysis, the treated filaments show no more than trace amounts of nitrogen. The PBT fibers also show presence of oxidized sulfur by this technique.

The fibers obtained in accordance with the present invention can be used to reinforce a variety of thermosetting and thermoplastic polymer matrix materials. Epoxy resin is the preferred matrix material but unsaturated polyesters, polyurethanes, rubbers, and polyamides and polyesters can also be employed. If desired, the treated fibers can be used together with other fibers as reinforcement. The composites find applicability in a variety of end-uses, particularly as structural members for the aircraft and aerospace industries. For reinforcement purposes, the treated fiber is generally used in the proportions of about 40 to 70% by volume in the composite.

Preparation of the treated fiber is rather straightforward. PBT, may be prepared by the technique described in Wolfe, U.S. Pat. No. 4,225,700. Spinning of the polymer may be achieved through use of the process and apparatus described in *Macromolecules* 1981, 14, 1135–1138, published by the American Chemical Society.

Poly(p-phenylene-cis-benzobisoxazole) hereinafter PBO, may be prepared by the method shown in *Macromolecules* 1981 14, 909–915 and in U.S. Pat. No. 4,051,108. It is known in the prior art to heat treat PBT filaments to temperatures as high at 575° C. for as long as two minutes. However, such treatments have been performed in nitrogen or other inert gas atmospheres. PBO fibers are usually treated at lower (100°–200° C.) temperatures.

The following example is illustrative of the invention.

EXAMPLE

A quantity of PBT (intrinsic viscosity of 15.0) in the form of a ribbon containing polyphosphoric acid was cut into pieces and repeatedly agitated with distilled water in a blender to extract residual acid, until the water no longer showed a change in pH. The PBT polymer, now in particulate form, was dried at 100° C. and then added to an 8.5 wt. % solids dope (polymer in polyphosphoric acid) in sufficient quantity to make a 12.0 wt. % solids dope, which was then mixed at 150° C. for 2½ hours. The hot dope was then deaerated while being transferred into a spinning cell, as described below.

The spinning cell was a capillary rheometer modified for spinning filaments by replacing the extrusion capillary with a 10-hole spinneret having round orifices 102 μm in diameter. The apparatus was also modified by providing a side tube leading from the barrel reservoir near its top to permit evacuation of the reservoir. To load the spinning cell, another capillary rheometer with its extrusion capillary replaced by a spinneret having a single orifice comprised of two slots, each 1.27 cm (0.5 in) long and 0.0635 cm (0.025 in) wide and intersecting at their centers to form a cross, was mounted on top of the rheometer being used as a spinning cell. Each of the rheometers was equipped with a filter pack assembly above the spinneret containing a filter disk made of 304 series stainless steel fibers metallurgically bonded into a multilayered matrix and having a mean pore size of 7 microns, the largest pores present measuring no more than 10 microns (X5 Dynalloy ® Filter Disk, manufactured by Fluid Dynamics, Cedar Knolls, N.J.). Both rheometers were heated to about 150° C., and the hot dope was transferred to the upper rheometer. The lower rheometer being used as a spinning cell was evacuated and a plunger inserted on top of a polytetrafluoroethylene plug was employed to extrude the dope through the cross-shaped orifice into the evacuated spinning cell, deaerating the hot dope. The upper rheometer was then removed and the polytetrafluoroethylene plug and the plunger were mounted on top of the spinning cell. The dope was extruded from the spinning cell at the rate of 1.068 ml/min at 125° C. The filaments extruded from the orifices passed through an air gap of 0.64 cm and thence into a bath of water having a temperature of about 5° C. At a distance of 1.25 cm below the surface of the water the filaments entered a funnel and the filaments and water together were passed out through a tube at the bottom of the funnel. The filaments were passed around a guide pin to remove them from the stream of water and were then wound up on bobbins at 77 meters per minute. The calculated spin stretch factor was 5.8. The bobbins of as-spun PBT yarn were soaked in water for several days and the yarn was then allowed to air-dry on the bobbins.

For heat treatment of the PBT yarn, a 3-foot long temperature tube furnace was constructed by placing a 1" ID ceramic tube inside three 1-foot Lindberg tube furnaces in series. Each furnace was separately controlled with a thermocouple placed in the treatment zone. The tube (volume=0.7 l.) was purged with a continuous flow of gas (10 l. per minute) monitored with a flow meter. The as-spun yarn was passed from the wind-up bobbins through a water bath in contact with a wet sponge and then through the tube oven. Tension was applied to the yarn with magnetic hysteresis brakes (GE Model CR9540-AA401AA) placed in series. The brakes have constant torque ratings regardless of the rate of shaft rotation (i.e., yarn speed).

Sufficient PBT yarn (530 denier, 240 filaments) for fabrication of a small composite was heat treated via two methods. The first (control) was done in an inert atmosphere (nitrogen), with the ovens controlled at 690° C., at a yarn speed of 3 feet per minute (1 minute oven residence time), and at a yarn tension of 750 grams (1.4 gpd tension). The second (surface activated) method utilized the process of the present invention; instead of an inert environment, the PBT yarn was heat treated in an atmosphere containing a partial pressure of oxygen of 50 mm Hg. This was accomplished by metering in a 2:1 $N_2$/air mixture. The oven temperature, yarn speed, and tension was the same as the control described above. The tenacity/modulus of the control and surface activated sample was 25/2040 gpd and 21/1960 gpd, respectively.

Each of these two heat treated samples (control and surface treated) was kept overnight at 90° C. in a vacuum oven. For composite fabrication, the yarn was passed through a tensioning device and impregnated with a liquid matrix resin as follows: 100 parts by weight of epoxy resin (Epon 826 Shell Chemical Co.) with 25 parts by weight of diglycidyl ether of 1.4 butanediol (Araldite RD-2, Ciba-Geigy Corp.), and 30 parts by weight of Curing agent (Tonox, Uniroyal Co.).

Resin coated fiber was wound into the cavities of a rectangular mold having two cavities. 6" long×¼" wide×½" deep. Two cover plates were laid on the cavities and screws were partially tightened to hold the cover plates to the mold. Four shims (5" thick) were placed between the mold and the cover plates to give desirable sample thickness.

The complete mold was then placed in a vacuum chamber at room temperature and at 20 inch Hg vacuum for 5 hours to degas the resin. All screws were tightened and the sample cured in the vacuum oven overnight (16 hrs.) at 110° C.

The cured composites were cooled down to ambient temperature. The screws and cover plates of the molds were removed. (All metal parts were sprayed with mold release before winding for easy disassembly). The composite was cut with a saw to give two unidirectional filament wound samples of 6" long×¼" wide×½" thick. Fiber volume was 60% and all fiber is aligned in the length direction.

Interlaminar Shear Strength was measured according to the test procedures of ASTM D 2344-76. A span to depth ratio of 4:1 was employed as well as loading at three points. The table below gives the results obtained using the treatment within the scope of the invention and an untreated (except for heat-treatment in nitrogen atmosphere) control. Also shown is the percent improvement.

| Yarn Treatment | Interlaminar Shear Strength (psi) |
| --- | --- |
| None (control) | 4340 |
| Surface Activated | 5770 (+33%) |

It is seen from the above that the interlaminar shear strength is significantly improved through use of the present invention.

The yarns were evaluated by Electron Spectroscopy Surface Analysis according to the procedure in Advances in Colloid and Interface Science, 5 p. 79-103 (Elsevier; 1975). The apparatus employed in a Du Pont model 650 electron spectrometer (Du Pont Co., Wilmington, Del.). The method is sensitive to about 0.1 atomic percent. The data obtained is as follows:

| Yarn | Atomic Percent | | | | |
| --- | --- | --- | --- | --- | --- |
| | C | N | S | ($SO_x$) | O |
| Control | 84 | 3.4 | 5.0 | 0 | 7.6 |
| Surface Activated | 89 | trace | 1.8 | 0.4 | 8.9 |

The reduction in the amount of nitrogen present at the filament surface is believed to be responsible for the improvement in adhesion as shown by interlaminar shear strength.

What is claimed is:

1. A method of improving adhesion of filaments of poly(p-phenylene-trans-benzobisthiazole) or poly(p-phenylene-cis-benzobisoxazole) comprising heating the filaments in a gas mixture of from about 1 to 10% of oxygen and from about 90 to 99% of an inert gas, at a temperature of from 500° C. to 700° F. for from 1 to 100 seconds.

2. A method according to claim 1 where the filaments are under tension of up to 2 grams per denier during the heat treatment.

3. A filament produced by the process of claims 1 or 2.

* * * * *